Dec. 26, 1950 J. A. RAWLINS 2,535,454
AIR LUBRICATED THRUST BEARING
Original Filed Oct. 5, 1945 2 Sheets-Sheet 1
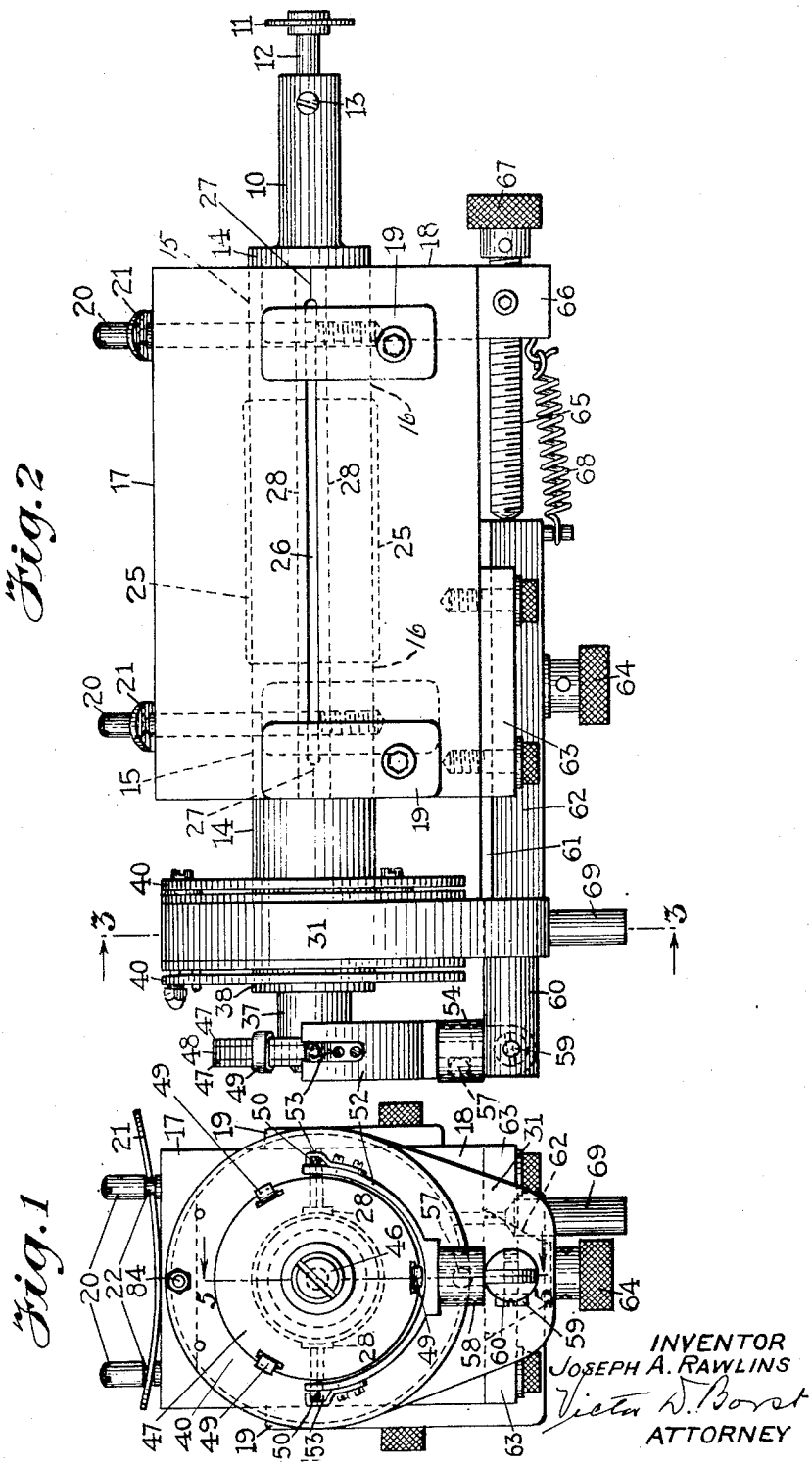
INVENTOR
JOSEPH A. RAWLINS
ATTORNEY

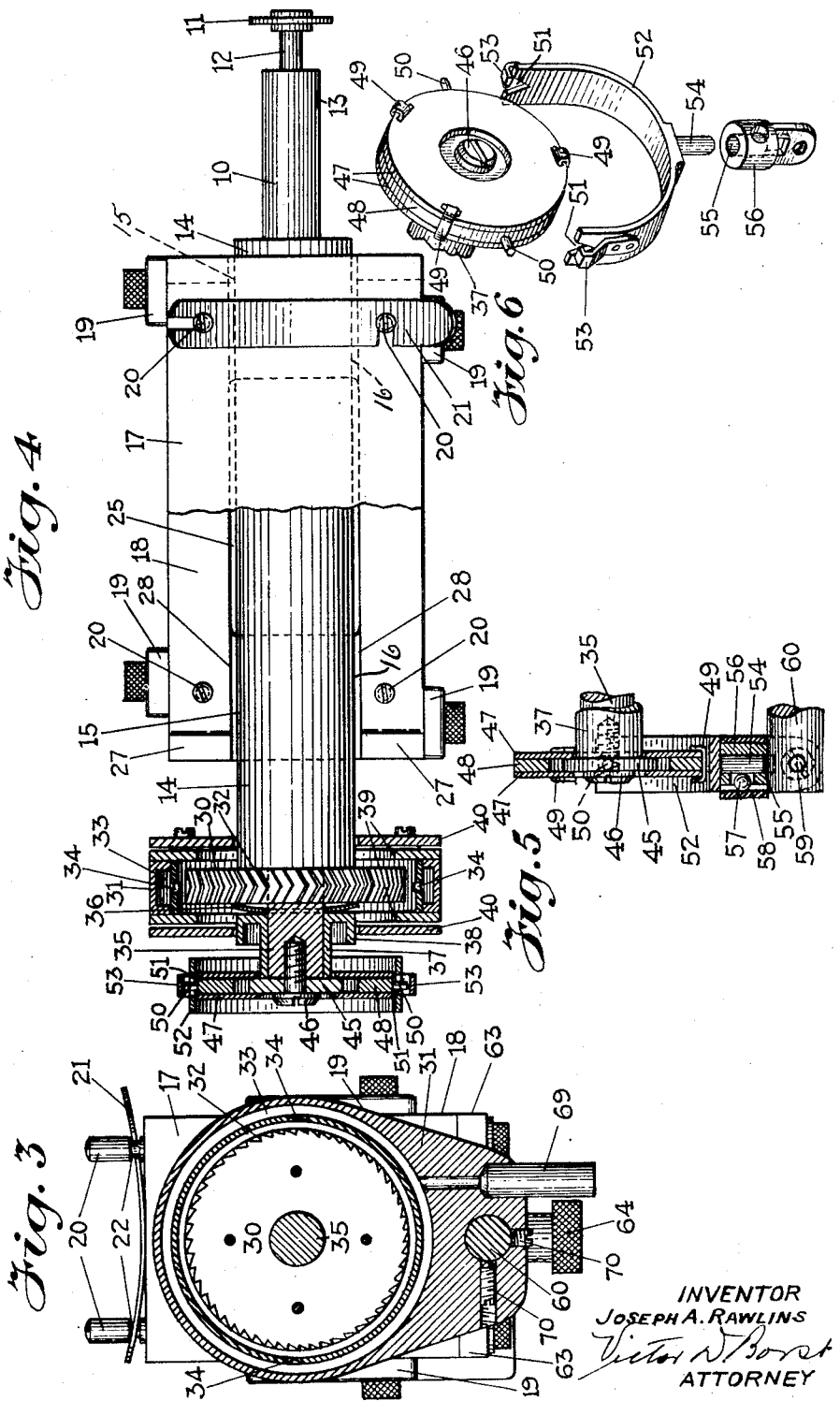

Patented Dec. 26, 1950

2,535,454

UNITED STATES PATENT OFFICE 2,535,454

AIR LUBRICATED THRUST BEARING

Joseph A. Rawlins, Tenafly, N. J., assignor to The Sperry Corporation, a corporation of Delaware Original application October 5, 1945, Serial No. 620,523. Divided and this application June 17, 1948, Serial No. 33,532

2 Claims. (Cl. 308—161)

This invention relates to gas lubricated bearings and more particularly to bearings which are lubricated by air or other gas under a pressure developed by relative movement of the bearing parts.

This application is a division of my co-pending application Serial No. 620,523, filed October 5, 1945, now Patent 2,511,543, dated June 13, 1950, for Gas Lubricated Bearing.

An object of the invention is to provide a bearing of the above type having novel and improved operating characteristics.

Another object is to provide a bearing having extremely small clearance for accurately positioning the rotating shaft.

Another object is to provide a bearing for high speed spindles which absorbs a minimum amount of power.

Various other objects and advantages will be apparent as the nature of the invention is more fully disclosed.

The present invention is particularly applicable to spindles for high speed tools such as small diameter grinding wheels which may operate at speeds of the order of 50,000 R. P. M. The bearing may have a clearance of the order of .0001 inch so as to position the tool accurately and cause it to operate without wabble or side play.

It has been found that bearings of the above type have a tendency to bind after an interval of time. This may be due to fine particles which are drawn in with the air and become wedged between the bearing surfaces or may be due to other causes. The present invention overcomes this difficulty and provides a bearing which is capable of operating indefinitely without binding or undue increase in temperature.

Although the novel features which are believed to be characteristic of this invention are pointed out more particularly in the claims appended hereto, the invention itself may be better understood by referring to the following description taken in connection with the accompanying drawings in which specific embodiments thereof have been set forth for purposes of illustration.

In the drawings:

Fig. 1 is an end elevation of an air-lubricated spindle embodying the present invention;

Fig. 2 is a side elevation thereof;

Fig. 3 is a transverse section taken on the line 3—3 of Fig. 2;

Fig. 4 is a top plan view of the air-lubricated spindle with parts broken away to show the construction thereof;

Fig. 5 is a detail view showing the support of the thrust bearing;

Fig. 6 is an exploded view of parts of the thrust bearing support.

Referring to the drawings, the invention is shown as applied to a spindle 10 carrying a tool, shown as a grinding disc 11, mounted on a shank 12 which is secured to the spindle 10 by suitable means shown as a set screw 13. The spindle 10 is provided with an enlarged cylindrical bearing section 14 which is journalled in bearing surfaces 15 and 16 formed in upper and lower bearing blocks 17 and 18, respectively.

The lower bearing block 18 constitutes a fixed support and is mounted by any suitable means not shown. The upper bearing block 17 is accurately positioned transversely of the lower bearing block 18 between clips 19. Studs 20 are secured in the lower bearing block 18 and extend through holes in the upper bearing block 17 so as to position the upper bearing block axially relative to the lower block and to allow vertical movement of the upper block. The upper bearing block 17 is yieldably held against the lower bearing block 18 by means of slotted leaf springs 21 which engage grooves 22 in the studs 20.

The bearing blocks 17 and 18 are formed with cylindrical chambers 25 extending axially of the blocks between the bearing surfaces 15 and 16. The radius of the chambers 25 is such as to provide substantial clearance for the bearing section 14 of the spindle. Horizontal slots 26, formed half and half in the two bearing blocks, extend from the chambers 25 to the outside of the blocks between shoulders 27. The shoulders 27 form the contacting surfaces for the two bearing blocks and are accurately finished to determine the minimum bearing clearance. The clearance between the bearing section 14 and the bearing surfaces 15 and 16 is of the order of .0001 inch when the shoulders 27 are in contact. This clearance, however, is permitted to be increased by separating the bearing blocks 17 and 18 against the pressure of the springs 21.

Axial channels 28 (Fig. 1) are formed half and half in the bearing blocks 17 and 18 along the parting line so that the bearing surfaces 15 and 16 are removed for a short distance each side of the parting line.

The spindle 10 is shown as rotated by an air turbine comprising a rotor 30 enclosed in a housing 31 and having suitable driving vanes 32. The housing 31 includes an air chamber 33 and admission ports 34 by which air is supplied to the vanes 32 in the usual manner for causing rotation of the rotor. The rotor 30 is mounted upon an extension 35 of the spindle 10 which is of reduced section, and is frictionally held against the enlarged bearing section 14 by means of a spring 36. An annular sleeve 37 is mounted on the extension 35 of the spindle and has an annular rim 38 of the same diameter as the bearing section 14. Air is discharged from the turbine through openings 39 formed in the housing 31 around the rim 38 and around the bearing section 14. Baffle plates 40 are spaced from the two sides of the housing 31 in a manner to control the exhaust air pressure on the two sides of the rotor.

An end thrust bearing is formed by a disc 45 which is attached to the end of the extension 35 by means of a screw 46. The disc 45 runs between stationary annular plates 47 which are yieldably secured on opposite sides of a ring 48 by means of spring clips 49. The ring 48 is provided with diametrically opposite trunnions 50 which are supported in V-slots 51 in a yoke 52 and are secured against removal by spring clips 53. The yoke 52 is provided with a radially extending pin 54 which is journalled in a recess 55 in a block 56 and is frictionally secured by a ball 57 which is held against the pin 54 by means of a split cylindrical spring clip 58. The block 56 is secured by a screw 59 to an arm 60 which is carried by a slide 61. The slide 61 is provided with inclined surfaces 62 which are slidably held in gibs 63 to permit axial adjustment. The slide 61 is secured in adjusted position by means of a clamping screw 64. The slide 61 is mounted for adjustment by means of an adjusting screw 65 which is threaded in a bracket 66 formed as a part of the lower bearing block 18 and is adjusted by a hand knob 67. A spring 68 holds the slide 61 against the end of the screw 65. The slide 61 also carries the housing 31 of the air turbine. The housing is secured to the arm 60 of the slide by set screws 70. Compressed air is supplied to the turbine through a duct 69.

In the operation of this device the spindle 10 is rotated by the compressed air turbine in a manner which will be readily understood. The lubricant for the bearing surfaces 15 and 16 constitutes air which is compressed between the bearing surfaces 15 and 16 and the bearing section 14 of the spindle 10 due solely to the relative rotation of the parts. The air is accordingly maintained at a pressure which is above that of the surrounding atmosphere due solely to the rotation of the parts themselves.

As above pointed out, the clearance between the bearing surfaces 15 and 16 and the bearing section 14 of the spindle is extremely small such as of the order of .0001 inch, hence any foreign particles which might be drawn in from the surrounding atmosphere would tend to interfere seriously with the operation of the spindle. In the construction disclosed, however, the spring mounting for the upper bearing block permits sufficient relative radial movement of this bearing block to permit any such particles to pass through and to relieve any excess pressures which would force the particles into the bearing surfaces. The elimination of the bearing surfaces axially along the parting line between the bearing blocks by channels 28 obviates the necessity of providing yieldable support for the bearing surfaces 15 and 16 along this diameter. Although bearing blocks made in two sections are entirely satisfactory for most uses, it is apparent that the bearing block may be made in three or more sections if necessary.

It has been found that with this construction, the operation is extremely stable. The rotation of the grinding disc 11 is controlled accurately for precision grinding purposes inasmuch as the bearing clearance is so small that no appreciable side play can take place. It has been found that the device may be operated indefinitely at extremely high speed without developing more than a few degrees rise in temperature and in tests it has been found that if abrasive particles which are in the surrounding air are drawn into the bearing they pass freely through without injury thereto.

The thickness of the ring 48 is such that the clearance between the disc 45 and the annular plates 47 is of the same order as that between the spindle and the bearing surfaces 15 and 16. The thrust bearing thus produced is lubricated by air which is compressed by rotation of the parts in the same manner as the cylindrical bearings above described. The thrust bearing thus positions the grinding wheel accurately in an axial direction.

It is noted that the spring clips 49 permit relative movement of the annular members 47 comparable to the movement of the upper bearing block 17 which is permitted by the springs 21. Hence the thrust bearing is likewise prevented from being clogged or injured by the passage of fine particles therethrough. The thrust bearing is self-aligning due to the pivotal movement of the ring 48 about the trunnions 50 and the pivotal movement of the yoke 52 about the axis of the pin 54. The ring 48 and the plates 47 are thus mounted for universal movement so that they are self-aligning with the disc 45.

Inasmuch as the bearing section 14 of the spindle 10 is longer than the bearing blocks 17 and 18, the spindle may be axially adjusted by means of the adjusting screw 65 which positions the slide 61 carrying the housing 31 of the air turbine and the thrust bearing.

Although certain specific embodiments of the invention have been shown for purposes of illustration, it is to be understood that the invention is capable of various uses and that changes and adaptations may be made therein as will be readily apparent to a person skilled in the art. The invention is only to be restricted in accordance with the scope of the following claims.

What is claimed is:

1. A gas lubricated thrust bearing for a high speed rotary spindle comprising a disc mounted on said spindle, a spacing ring surrounding the disc, means independent of the disc supporting the ring radially spaced from the disc while permitting relative universal movement of the ring, a pair of annular plates slidably mounted on the spindle on opposite sides of the disc and ring, and spring means bearing on the outer faces of the plates and axially urging them toward the disc and ring while permitting movement of the plates to increase the normal spacing between the plates and disc in response to pressure developed therebetween.

2. A gas lubricated thrust bearing for a high speed rotary spindle comprising a disc mounted on said spindle, a spacing ring surrounding the disc, means independent of the disc supporting the ring radially spaced from the disc, a pair of annular plates slidably mounted on the spindle on opposite sides of the disc and ring, spring means bearing on the outer faces of the plates and axially urging them toward the disc and ring while permitting movement of the plates to increase the normal spacing between the plates and disc in response to pressure developed therebetween, and pivotal supporting means universally mounting the ring with respect to the disc.

JOSEPH A. RAWLINS.

REFERENCES CITED

The following references are of record in the file of this patent:

UNITED STATES PATENTS

| Number | Name | Date |
|---|---|---|
| 1,476,345 | McGee | Dec. 4, 1923 |

FOREIGN PATENTS

| Number | Country | Date |
|---|---|---|
| 462,602 | Great Britain | Mar. 11, 1937 |